United States Patent
Eriksson et al.

(10) Patent No.: US 9,731,393 B2
(45) Date of Patent: Aug. 15, 2017

(54) POWER TOOL AND METHOD OF OPERATING AN AUTOMATED DRILLING OPERATION

(71) Applicant: ATLAS COPCO INDUSTRIAL TECHNIQUE AB, Stockholm (SE)

(72) Inventors: Ulf Mikael Eriksson, Vallentuna (SE); Wilhelm Mattias Georgsson, Trangsund (SE)

(73) Assignee: Atlas Copco Industrial Technique AB, Stockholm (SE)

( * ) Notice: Subject to any disclaimer, the term of this patent is extended or adjusted under 35 U.S.C. 154(b) by 610 days.

(21) Appl. No.: 14/356,082

(22) PCT Filed: Oct. 25, 2012

(86) PCT No.: PCT/EP2012/071150
§ 371 (c)(1),
(2) Date: May 2, 2014

(87) PCT Pub. No.: WO2013/064420
PCT Pub. Date: May 10, 2013

(65) Prior Publication Data
US 2014/0318290 A1    Oct. 30, 2014

(30) Foreign Application Priority Data
Nov. 4, 2011   (SE) ...................................... 1151040

(51) Int. Cl.
*B23Q 11/04* (2006.01)
*B23Q 5/32* (2006.01)
(Continued)

(52) U.S. Cl.
CPC ............. *B23Q 5/027* (2013.01); *B23Q 5/326* (2013.01); *B23Q 5/402* (2013.01); *F16H 25/20* (2013.01); *Y10T 74/18576* (2015.01)

(58) Field of Classification Search
CPC ........ B23Q 11/04; B23Q 5/261; B23Q 5/027; F16H 25/20
(Continued)

(56) References Cited

U.S. PATENT DOCUMENTS 4,538,942 A * 9/1985 Vindez ................... B23Q 5/326
173/146
4,612,998 A * 9/1986 Vindez ................... B23Q 5/326
173/145
(Continued)

OTHER PUBLICATIONS

International Search Report (ISR) dated Jan. 21, 2013 issued in International Application No. PCT/EP2012/071150.

*Primary Examiner* — Andrew M Tecco
*Assistant Examiner* — Praachi M Pathak
(74) *Attorney, Agent, or Firm* — Holtz, Holtz & Volek PC

(57) ABSTRACT

A power tool includes a pneumatic motor with an output shaft, a spindle that is drivingly connected to the output shaft via a drive gear to provide a rotational movement to the spindle and via a feed gear to provide a translational movement to the spindle. A cylinder that governs the gear transmission to the feed gear is arranged to be translated between a retraction gearing position and an advancement gearing position. The retraction gearing includes a retraction torque limiting coupling adapted to be released when an operational torque (T) exceeds a retraction threshold torque ($T_R$) in order to terminate retraction. A lock mechanism is arranged to selectively block the cylinder in the retraction gearing position through engagement between a tooth of a ratchet on the lock mechanism and a shoulder on the cylinder. The lock mechanism assures that the cylinder is kept in the retraction gearing position during an initial phase of the retraction of the spindle.

11 Claims, 9 Drawing Sheets

Figure 1:
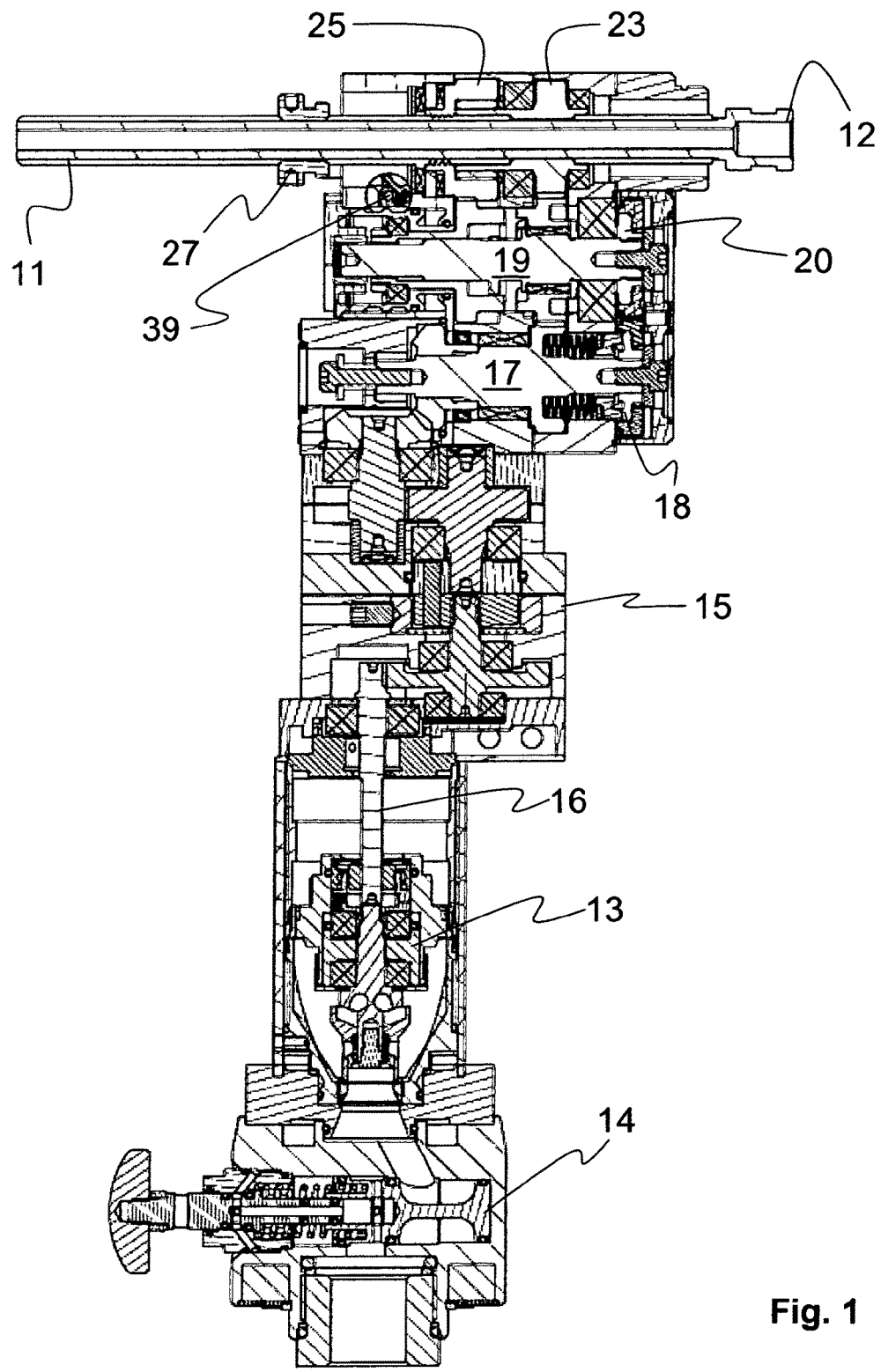

(51) Int. Cl.
*B23Q 5/40* (2006.01)
*B23Q 5/02* (2006.01)
*F16H 25/20* (2006.01)
*B23Q 5/027* (2006.01)

(58) Field of Classification Search
USPC .................................. 173/213; 408/124, 129
See application file for complete search history.

(56) References Cited

U.S. PATENT DOCUMENTS

| | | | | |
|---|---|---|---|---|
| 4,681,490 | A * | 7/1987 | Pennison | B23Q 5/326 173/154 |
| 4,799,833 | A * | 1/1989 | Pennison | B23Q 5/326 173/146 |
| 5,022,800 | A * | 6/1991 | Vindez | B23Q 5/326 173/19 |
| 6,196,772 | B1 * | 3/2001 | Thames | B23Q 5/326 408/1 R |
| 2014/0238711 | A1 * | 8/2014 | Myhill | B25F 5/001 173/1 |
| 2014/0290974 | A1 * | 10/2014 | Eriksson | B23Q 5/326 173/141 |
| 2014/0318290 | A1 * | 10/2014 | Eriksson | B23Q 5/326 74/89.23 |

* cited by examiner

POWER TOOL AND METHOD OF OPERATING AN AUTOMATED DRILLING OPERATION

The invention relates to a pneumatic power tool and to a method of operating an automated drilling operation. In particular, the invention is directed to an advanced drilling equipment (ADE) adapted to perform multiple consecutive drilling operations in an automated manner.

BACKGROUND

A conventional pneumatic power tool comprises a spindle with a socket into which a drill bit may be inserted. The spindle is conventionally driven by two separate gears, which are normally arranged as sleeves coaxially around the spindle. A first gear, the drive gear, is arranged in axial splines in order to drive the rotation of the spindle. The second gear, the feed gear, is threaded onto the spindle such that the mutual rotation between the feed gear and the spindle creates an axial movement there between that feeds the spindle in an axial direction. The feed gear may be geared so as to either advance or retract spindle.

Conventionally, the spindle is advanced in that the threaded feed gear rotates at a slightly higher rotational speed than the spindle. When the drilling operation is concluded the feed gear is positioned into an angularly blocked position. Thereby, as the feed gear is blocked from rotation, the continued rotation of the spindle with respect to the feed gear will rapidly retract the spindle back to its initial position.

A problem inherent in such conventional pneumatic power tools is that the spindle and/or the gear that feeds the spindle might get jammed due to the relatively high rotational speed of the spindle and the gears. This is troublesome not only because it implies that the jammed part needs to be loosened, but also because the parts of the tool will be exposed to heavy stress and wear.

Conventionally, this problem is solved by means of a pneumatic signal which is actuated during the last stages of the retraction phase in order to stop the motor by closing the main valve. The actuation of the pneumatic signal is triggered when the spindle has been retracted to a certain point, close to its fully retracted position. The optimal location of this point is governed by the intended rotational speed of the spindle. Typically, the location should be sufficiently close to the fully retracted position in order to assure that the inherent rotational energy of the spindle will be enough to bring it all the way back to the fully retracted position. On the other hand the location should be sufficiently far away from the fully retracted position in order to assure that the rotational speed is not too high such that the spindle will be jammed.

Hence, in the conventional technique, a compromise needs to be made in order for the tool to be adapted to different rotational speeds. This compromise of course means that for rotational speeds in the higher range the spindle will be jammed, and/or that for rotational speeds in the lower range the spindle may not be fully retracted.

An additional problem with the conventional arrangement is that the physical provision of the sensor for actuation of the pneumatic signal builds on the length of the head of the tool. Generally, it is always desired to keep the length of the head as short as possible in order to improve the workability of the tool in confined spaces.

Hence, there is a need for an arrangement that allows the spindle to be safely retracted regardless of the rotational speed of the spindle.

SUMMARY OF THE INVENTION

An object of the invention is to provide an arrangement with an improved return feeding of a spindle in a power tool.

A further object of the invention is to provide a pneumatic power tool with a more compact functional design.

Yet a further object of the invention is to provide a power tool with a jam free construction, in which the rotational speed of the spindle may be kept at a substantially high level without jeopardising the function of the tool.

According to a first aspect the invention relates to a power tool comprising a motor, a spindle, which is drivingly connected to the motor via a drive gear that provides a rotational movement to the spindle and via a feed gear (25) that is threaded onto the spindle such that mutual rotation between the feed gear and the spindle provides an axial movement to the spindle between a fully advanced position and a fully retracted position, wherein a first gear transmission is arranged to drive the feed gear so as to advance the spindle, and a second gear transmission is arranged to drive the feed gear so as to retract the spindle. The spindle operates at an operational torque, wherein the second gear transmission includes a retraction torque limiting coupling adapted to be released when the operational torque exceeds a retraction threshold torque, wherein a lock mechanism is arranged to selectively lock the retraction torque limiting coupling such that it will not be released.

In a specific embodiment of the invention the lock mechanism is arranged to lock the retraction torque limiting coupling when the spindle is in the fully advanced position.

In another embodiment of the invention the retraction torque limiting coupling is comprised of a smoothly toothed engagement, which is held together by means of a spring, the spring having a spring action that corresponds to the retraction threshold torque, such that the smoothly toothed engagement will be released when the operational torque exceeds a retraction threshold torque value.

In yet another embodiment of the invention a cylinder is arranged to control the gear transmission to the feed gear, which cylinder is arranged to be translated between a first gearing position, which corresponds to the first gear transmission, and a second gearing position, which corresponds to the second gear transmission, and wherein the spring acts on the cylinder towards the second gearing position in which the smoothly toothed engagement is achieved.

The lock mechanism may comprise a ratchet which is rotatable around an axis between a blocking position in which a tooth on the ratchet is pointed into an interaction area of the cylinder, in order to interact with a shoulder on the cylinder, and a non-blocking position in which the tooth does not reach into the moving area of the cylinder, and wherein the interaction between the tooth and the shoulder on the cylinder blocks the cylinder from moving out of the second gearing position.

Further the lock mechanism may comprise a lever, which is connected to the ratchet so as to rotate together with the ratchet, and wherein the spindle includes a stop ring which is arranged to act on the lever to position the ratchet in the blocking position as the spindle reaches its forward position.

The interconnection between the lever and the ratchet may include a freedom of motion that allows the ratchet to rotate with respect to the lever, and wherein a spring is arranged between the lever and the ratchet to act on the ratchet towards the blocking position whereby the ratchet may be moved with respect to the lever out of the blocking position against the action of the spring.

Further, a support may be arranged against which the ratchet is supported in the blocking position, and wherein the interaction between the support and the ratchet restricts the ratchet from rotating further in a direction that otherwise would allow the on the cylinder from moving past the interaction between the shoulder and the tooth and out of the second gearing position.

In one embodiment of the invention the ratchet has an outer cam profile that engages the support and that limits the rotational movement of the ratchet in the second gearing position.

In another embodiment of the invention the ratchet and lever are spring loaded towards the open position.

In yet another embodiment of the invention the cylinder defines a closed chamber which is sealed off by sealings with respect to a surrounding housing and an annular housing element, which chamber is expandable against the action of said spring to push the cylinder towards the first gearing position away from the annular housing element by the application of a pneumatic pressure inside said chamber.

In another embodiment of the invention the second gear transmission includes a second torque limiting coupling adapted to be released when the operational torque exceeds an advancement threshold torque value, which is higher than the retraction threshold torque value.

Further, a valve may be arranged to release the pressure acting in the chamber in response to that the operational torque exceeds the advancement threshold torque value such that the second torque limiting coupling is released and such that the cylinder will be translated towards the second gearing position by the action of a spring.

According to a second aspect the invention relates to a method of performing an automated drilling operation with an advanced drilling equipment (ADE) comprising a tool holding spindle, which method comprises the steps of:
  rotating the spindle by means of a drive gear connected to a motor,
  feeding the spindle by means of a feed gear connected to a motor via a positive gear transmission so as to perform drilling through a material,
  interrupting the positive feeding at a predetermined point of drilling,
  in response to the interrupted feeding, connecting the feed gear to the motor via a negative gear transmission so as to retract the spindle, and
  interrupting the retraction of the spindle by means of a retraction torque limiting coupling in response to that an operational torque needed to retract the spindle exceeds a retraction torque threshold value. A lock mechanism is arranged to lock the retraction torque limiting coupling during an initial phase of the retraction such that the retraction torque limiting coupling will not be released during the initial phase of the retraction.

In another embodiment of the second aspect of the invention the feeding of the spindle via the positive gear transmission is interrupted by means of an advancement torque limiting coupling in response to that the operational torque needed to feed the spindle exceeds a advancement torque threshold value, which is higher than the retraction torque threshold value.

Further objects and advantages of the invention will appear from the following specification.

SHORT DESCRIPTION OF THE DRAWINGS

Figure 2:
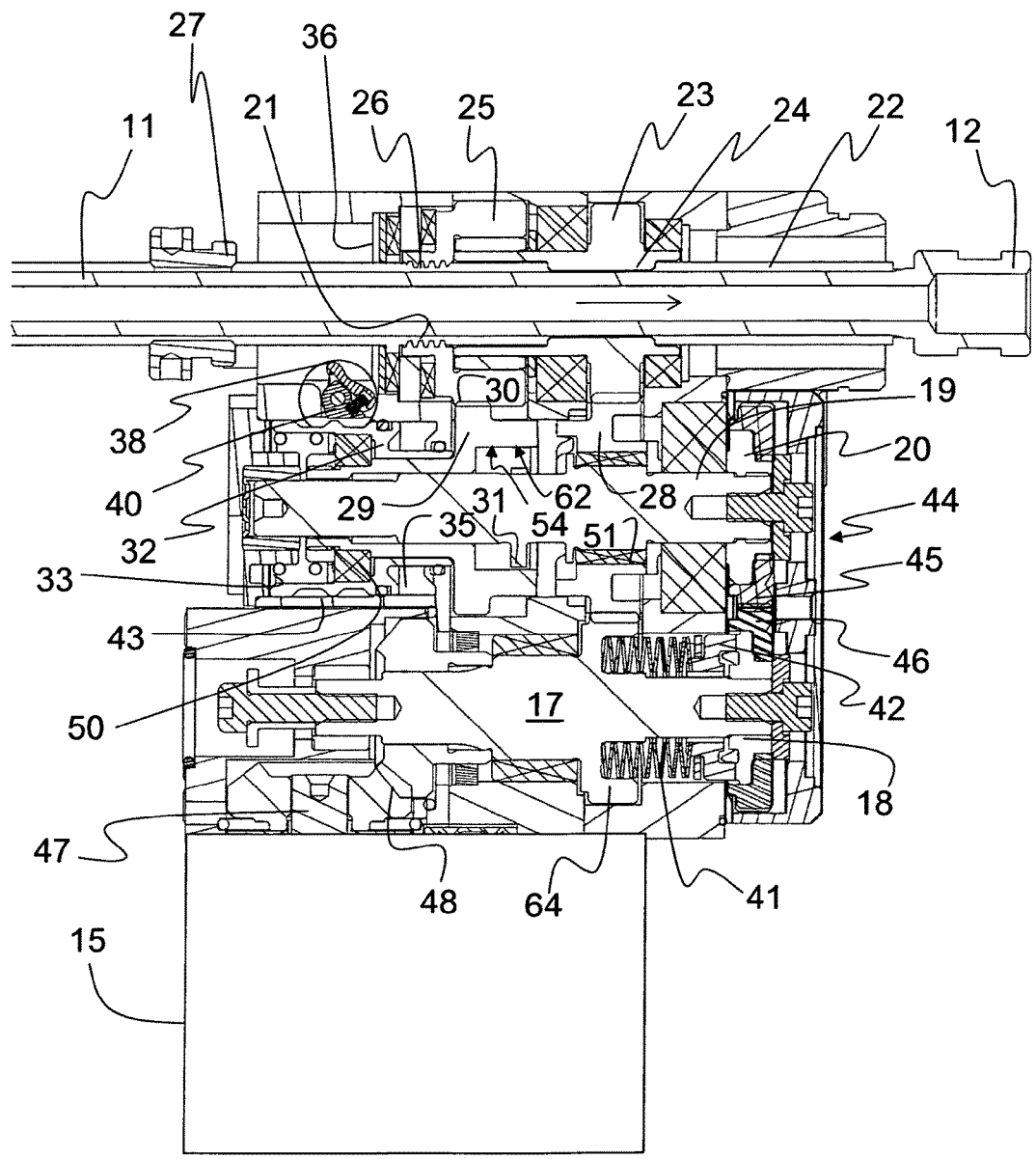
Figure 3:
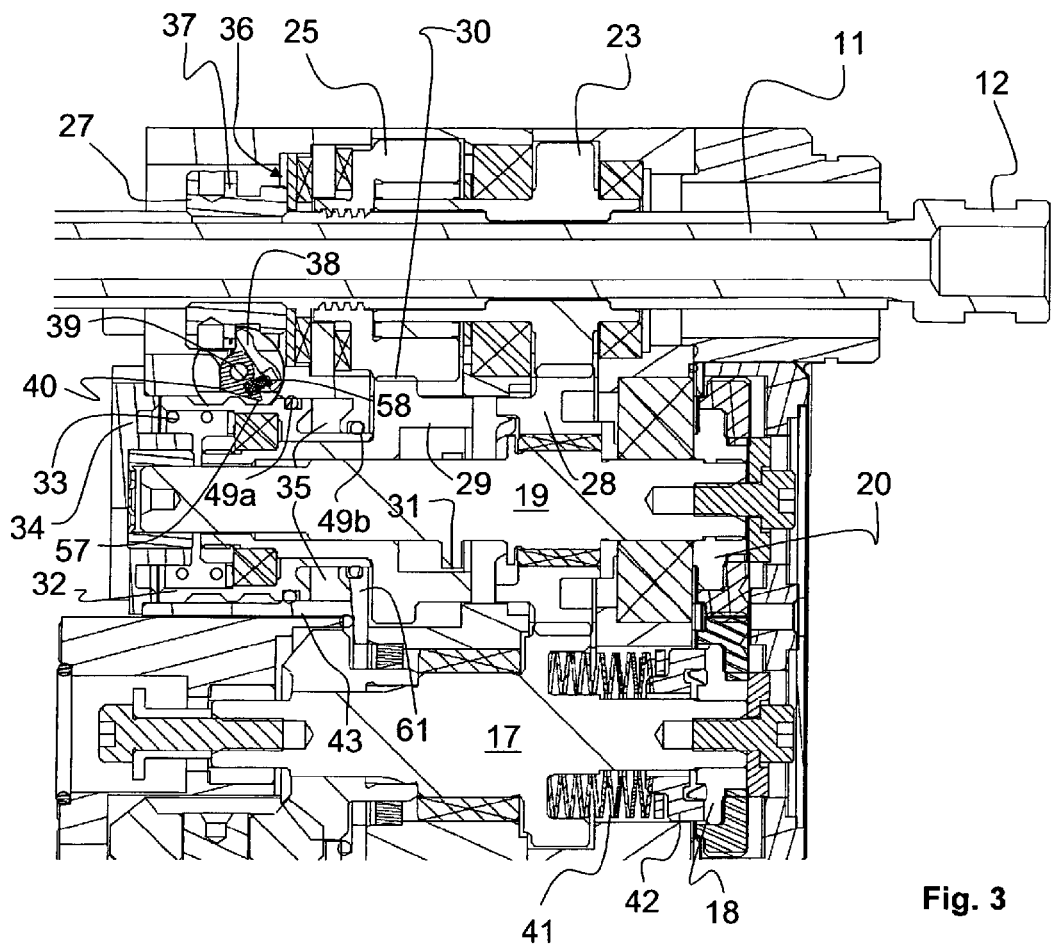
Figure 4A:
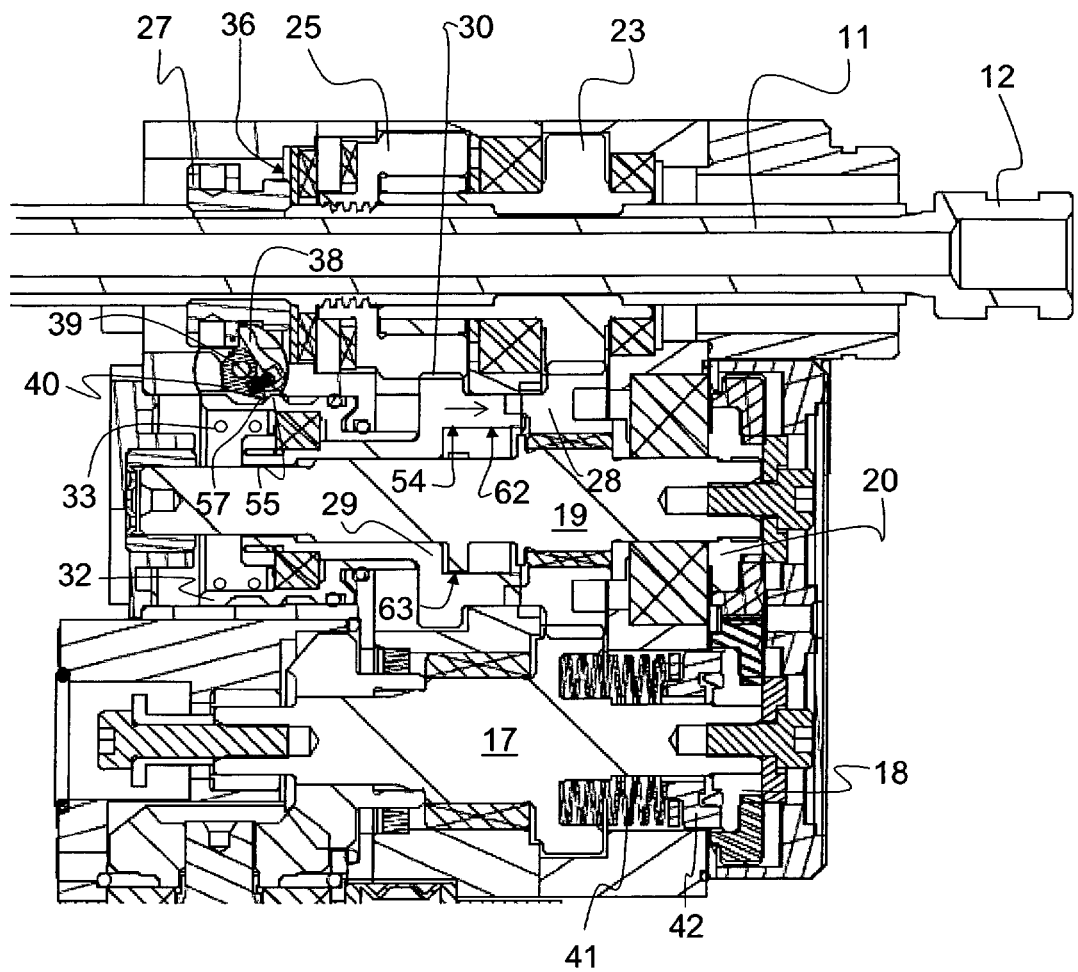
Figure 4B:
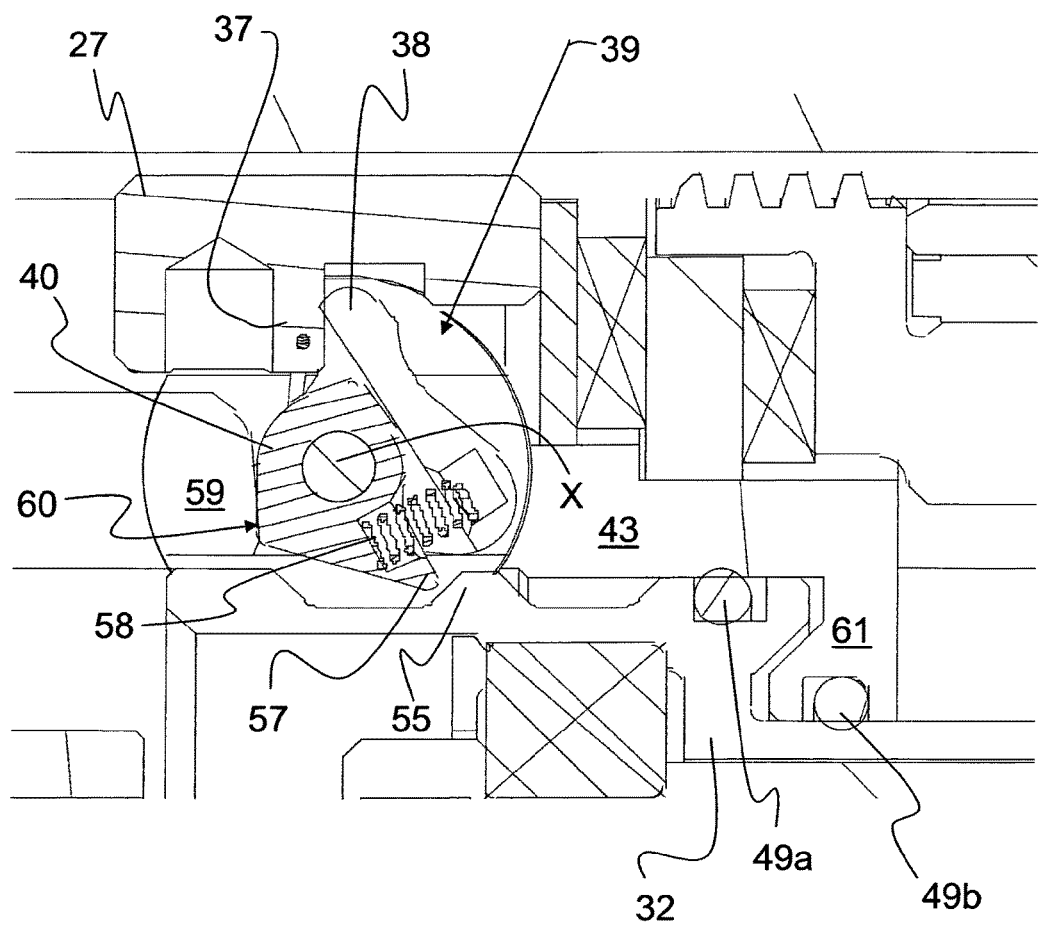
Figure 5:
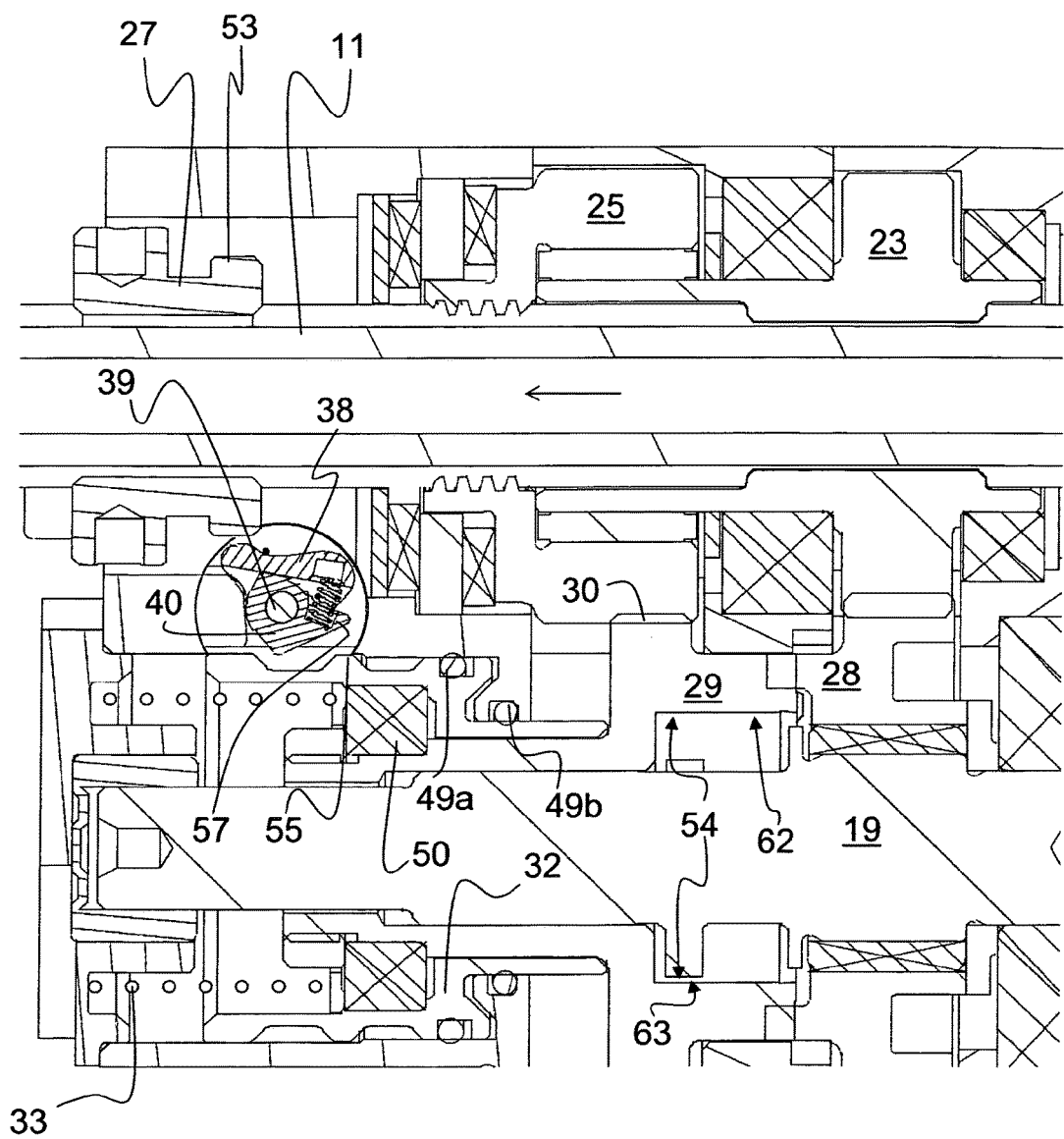
Figure 6:
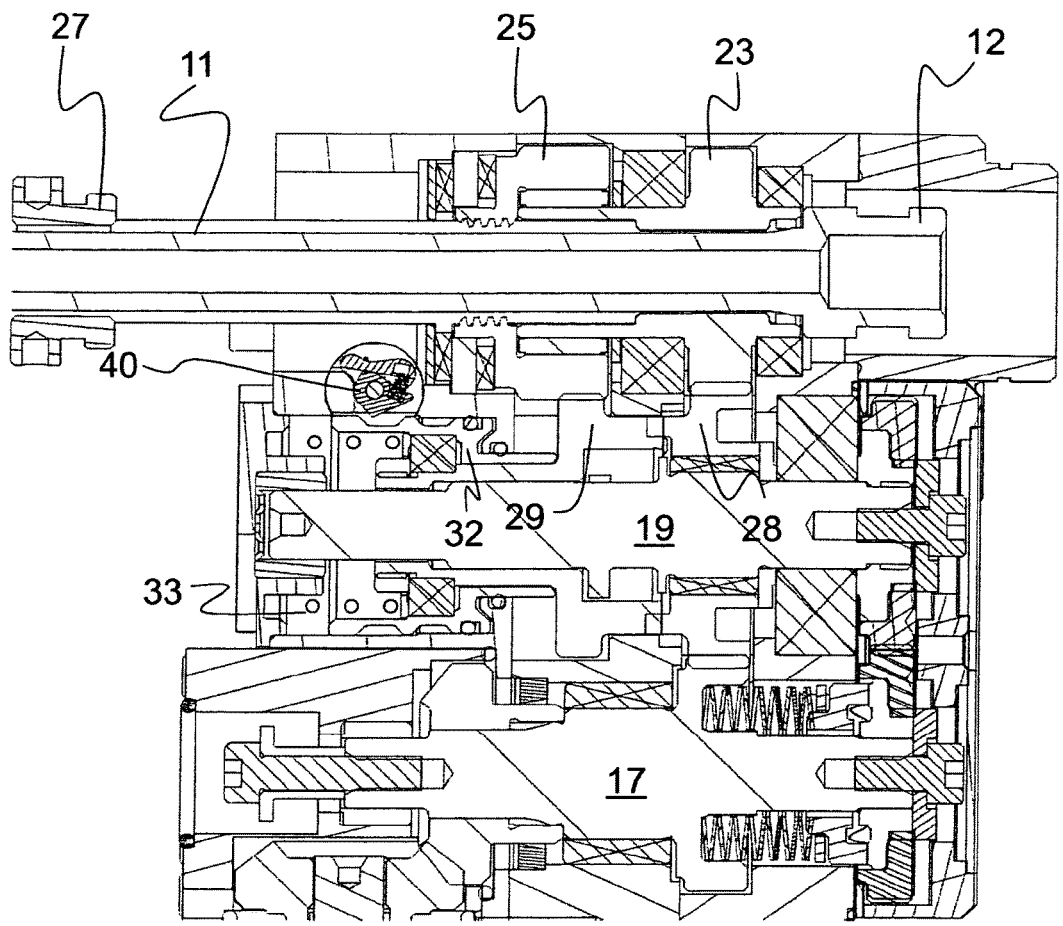
Figure 7:
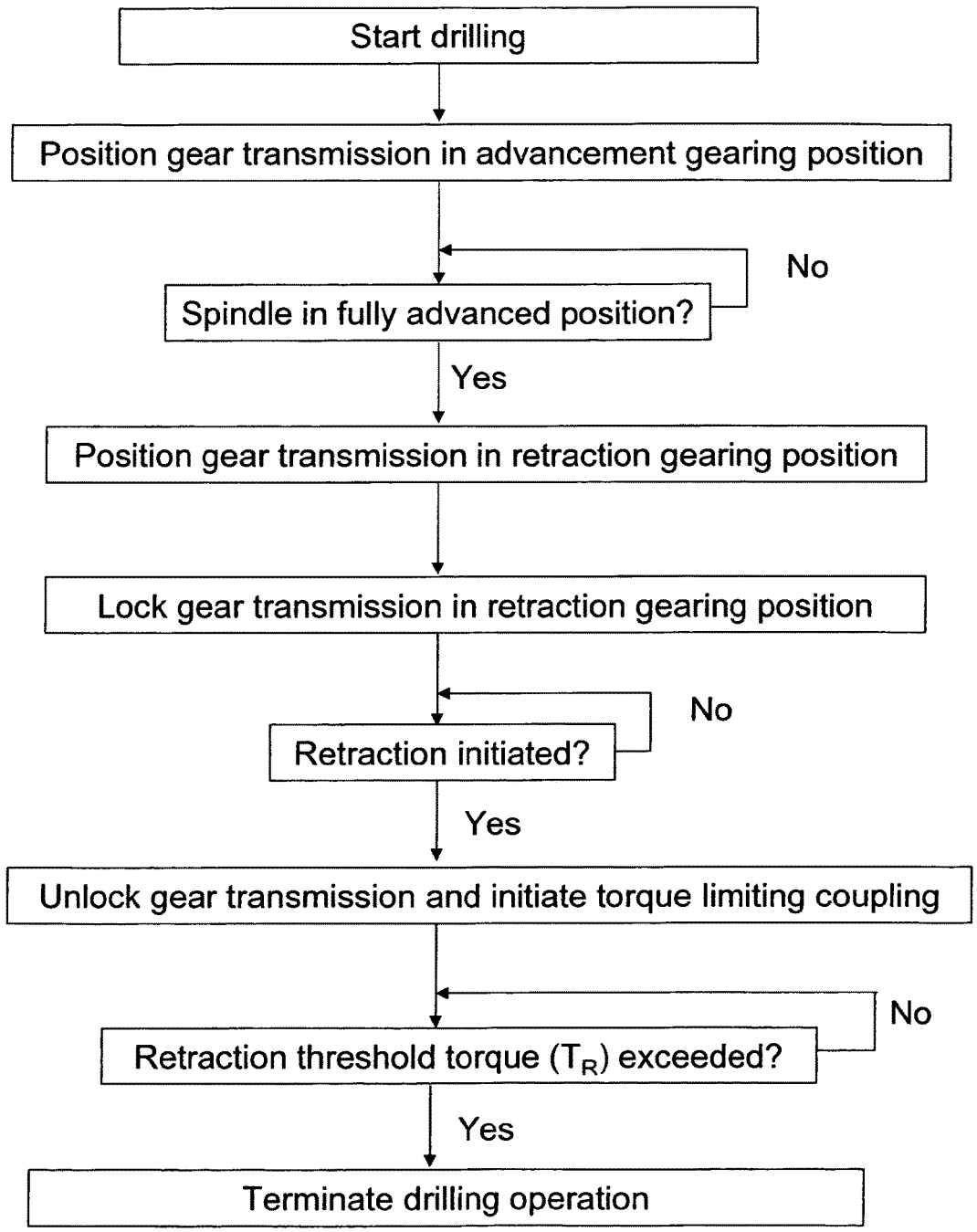
Figure 8:
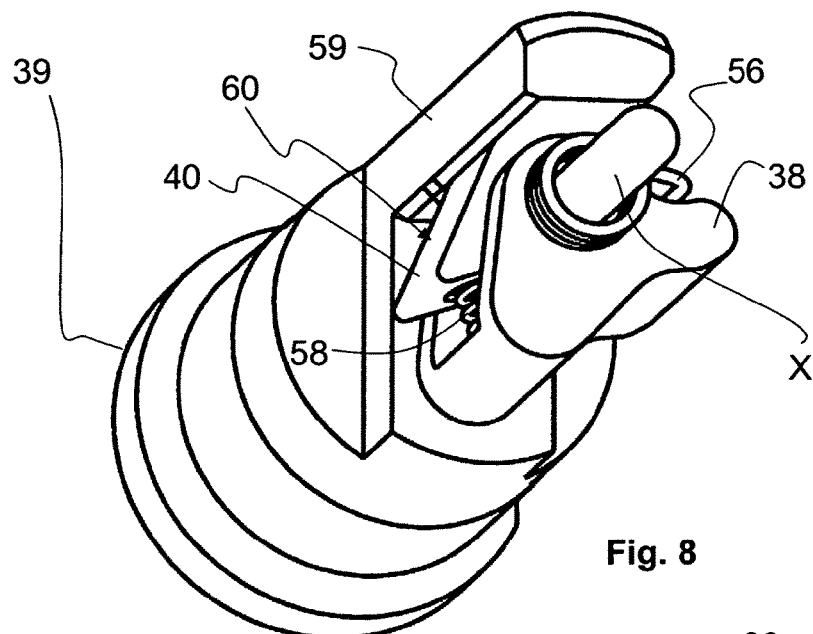
Figure 9:
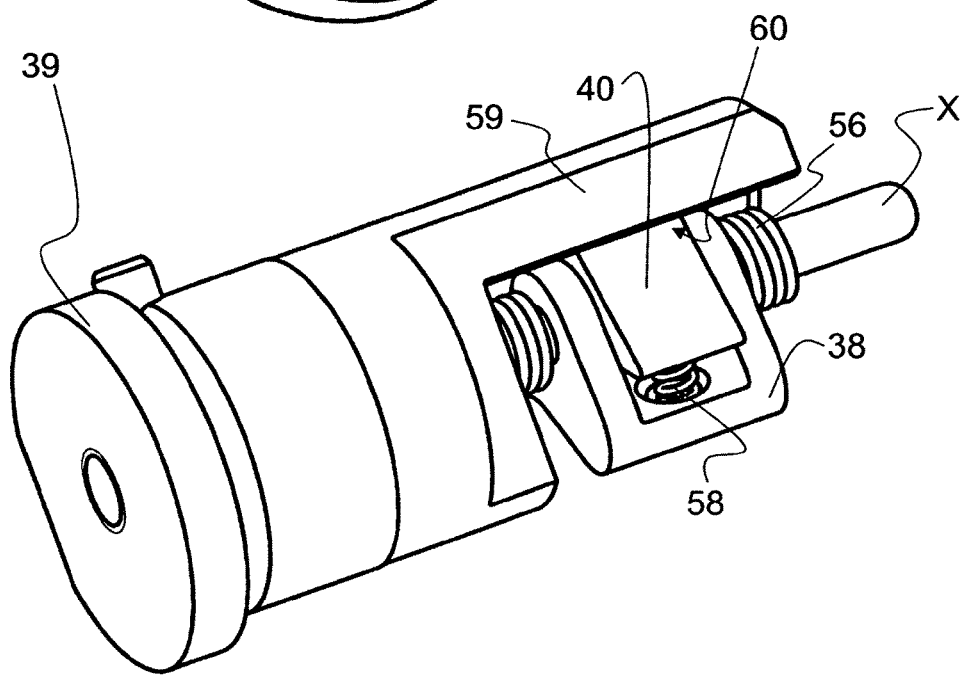

In the following detailed description reference is made to the accompanying drawings, of which:
  FIG. 1 shows a power tool according to a first embodiment of the invention;
  FIG. 2 shows a detailed view of the power tool shown in FIG. 1 in a first operational position;
  FIG. 3 shows a detailed view of the power tool shown in FIG. 1 in a second operational position;
  FIG. 4a shows a detailed view of the power tool shown in FIG. 1 in a third operational position;
  FIG. 4b shows a close up view of the view shown in FIG. 4a;
  FIG. 5 shows a detailed view of the power tool shown in FIG. 1 in a fourth operational position;
  FIG. 6 shows a detailed view of the power tool shown in FIG. 1 in a fifth operational position;
  FIG. 7 shows a block diagram of an exemplary method according to a second aspect of the invention;
  FIG. 8 shows a detailed view of a lock mechanism adapted to be used in the invention;
  FIG. 9 shows an alternative view of the lock mechanism shown in FIG. 8.

DETAILED DESCRIPTION OF ONE EMBODIMENT OF THE INVENTION

FIG. 1 shows a view of an embodiment of a pneumatic power tool 10 according to the invention.

The power tool includes a spindle 11, which is arranged to hold a cutting element, such as e.g. a drill bit (not shown), and to rotate and advance said drill bit. The drill bit is to be arranged in a socket 12 at the right, front end of the spindle 11. A pneumatic motor 13 is arranged in the lower part of the power tool in order to provide the operational torque T to rotate and advance the spindle 11.

The pneumatic motor 13 may e.g. be either a turbine motor or a vane motor. In the shown embodiment, the motor is a turbine motor. The motor is driven by compressed air. The air is let in to the motor via a main valve 14.

The motor 13 further includes an output shaft 16, which is geared down by means of a gear box 15 to a second gear shaft 17, which in turn is coupled via couplings 18 and 20 to a first gear shaft 19.

The invention is based on the notion that it is possible to retract the spindle by means of a coupling with a built in torque limitation coupling. The built in torque limitation coupling assures that the retraction movement is concluded at a predetermined retraction threshold torque value $T_R$.

In order to accomplish such an arrangement one complication needs to be addressed. The advancement feeding of the spindle 11 during the drilling operation needs to be relatively quick in order to keep up the productivity of the tool. This implies that the spindle 11 most likely will be jammed at the conclusion of the positive feeding drilling operation. Hence, the spindle 11 will have to be released from this jamming at the initial phase of the retraction operation. This implies that the operational torque T needed to start the retraction most definitely will be higher than the predetermined threshold value $T_R$. Therefore, as a consequence of the built in torque limitation coupling, the retraction will not start.

The idea of the invention is thus to block the torque limitation coupling during the initial phase of the retraction but to release this block during the final phase of the retraction such that the retraction will stop when the predetermined retraction torque threshold value $T_R$ is met. The retraction torque threshold value $T_R$ is preferably set such that the operational torque T needed to reinitialise the drilling operation is easily achieved by the feeding coupling arranged to advance the spindle 11.

FIGS. 2-6 show an embodiment of a pneumatic power tool according the invention in five different operational modes; normal drilling operation (FIG. 2), end phase of the normal drilling operation (FIG. 3), start of retraction of spindle (FIG. 4), retraction operation (FIG. 5), and the end of retraction operation (FIG. 6).

(1) Normal Drilling (FIG. 2)

During the normal drilling operation shown in FIG. 2 drilling is performed wherein the spindle 11, which at its front end includes a socket 12 that holds the drill bit (not shown). During the normal drilling phase, the spindle 11 is advanced, i.e. axially translated to the right in the figure, at the same time as the spindle 11 is rotated to create the drilling movement.

The spindle 11 comprises an external thread 21 that extends over substantially the whole length of the spindle 11. Further, the spindle 11 comprises at least one external axial groove 22, which extends axially over substantially the whole length of the spindle 11, such that the thread 21 is axially interrupted by said groove 22.

A drive gear 23 is arranged to drive the rotation of the spindle. The drive gear 23 includes an internal axial projection 24 that fits inside the axial groove 22 on the spindle 11, such that mutual axial movement is possible between the spindle 11 and the drive gear 23, but such that no mutual rotational movement is allowed between them.

Further, a feed gear 25 with an internal threading 26 is arranged in threaded engagement with the external threads 21 on the spindle 11. A stop ring 27 is fixedly arranged at the left, rear end of the spindle 11.

The drive gear 23 is drivingly connected to the motor 13 so as to rotate at a substantially constant speed throughout the operation of the tool. Specifically, the second gear shaft 17 is driven by the motor output shaft 16 via an angular bevelled coupling 48 and an output shaft 47 of the gear box 15. Further, the second gear shaft 17 is arranged to drive an intermediate drive gear 28 via a fixed coupling 64. The intermediate drive gear 28 is mounted on a bearing 51 around the first gear shaft 19, such that it may rotate freely with respect to said first gear shaft 19. The intermediate drive gear 28 is further coupled via a gear transmission, e.g. a toothed engagement, to the drive gear 23 in order to drive the spindle.

As indicated above, the complete coupling from the motor output shaft 16 to the drive gear 23 remains unchanged under the whole operation, such that the drive gear 23 and hence the spindle 11 will rotate at a constant speed during the complete operation. The rotational speed is defined by the motor 13 and the gear ratio of the gear box 15, and is normally set between 500 and 4 000 rpm. With the inventive construction, the rotational speed of the spindle 11 may be as high as 12 000 rpm. The high rotational speed is allowed due to the inventive feed gear arrangement, which is further described below.

The feed gear 25 is drivingly and interchangeably connectable to the motor 13 via a first and a second gear connection. Both these gear connections are achieved by one single intermediate feed gear 29, which is interposable along the first gear shaft 19 between two different gear positions. In both of these gear positions the intermediate feed gear 29 is coupled to the feed gear 25 via the same outer gear transmission 30.

In FIG. 2, the intermediate feed gear 29 is positioned in the first of these positions, which corresponds to the first gear position. In this first gear position the intermediate feed gear 29 is coupled via an inner gear transmission 31 to the first gear shaft 19. The gear ratio is such adapted in the this first gear position that the feed gear 25 will rotate slightly faster than the drive gear 23, such that the spindle 11 will be advanced when the intermediate feed gear 29 is positioned in the first gear position.

The inside surface of the intermediate feed gear 29 comprises a toothed section 62 that completes the inner gear transmission 31 to the first gear shaft 19. Inside of this toothed section 62, i.e. to the left in the figure, the intermediate feed gear 29 comprises an inner blank section 54 adapted not to engage with first gear shaft 19. Hence, when the intermediate feed gear 29 is translated towards the second of its two different positions, which corresponds to the second gear position, i.e. to the right in the figure, the engagement to the first gear shaft 19 will be released. This is further described below with reference to FIG. 4.

The different gear ratios from the second gear shaft 17 to the first gear shaft 19 and to the intermediate drive gear 28, respectively, is such arranged that the first gear shaft 19 rotates faster than the intermediate drive gear 28. The relation between these rotational speeds is indirectly affected by an exchangeable feed cassette 44. The feed cassette 44 includes a primary feed cassette gear 45 and a secondary feed cassette gear 46.

The first gear shaft 19 includes a first coupling 20, which is connected via e.g. a hexagonal connection to the primary feed cassette gear 45. The primary feed cassette gear 45 transmits the rotation from the secondary feed cassette gear 46, which is in turn coupled to the second gear shaft 17 via a second coupling 18 and a clutch sleeve 42.

Hence, the feed cassette 44 governs the relative speed between the first gear shaft 19 and the second gear shaft 17, which indirectly affects the relative speed between the first gear shaft 19 and the intermediate drive gear 28. Further, the relative rotational speed between the gear shafts 17 and 19, may be inversed by arranging the feed cassette in the opposite direction, i.e. with the secondary feed cassette gear 46 connected to the first coupling 20 and the primary feed cassette gear 45 connected to the first coupling 20.

It must however be noted that the relative speed between the drive gear 23 and the feed gear 25 is not only dependent on the relative rotational speed of the first and second gear shafts 17 and 19. As stated above, the direct transmission between the second gear shaft 17 and the intermediate drive gear 28 is such adapted that the intermediate drive gear 28 will rotate at a lower rotational speed than the first gear shaft 19, regardless of the gear ratio achieved by the feed cassette 44.

From this follows that it is possible to control the rate at which the spindle 11 will be advanced during the drilling operation by means of the feed cassette 44. The feed cassette 44 may either be inversed or replaced by another feed cassette with another gear ratio. Other parameters, including the retraction speed, will remain unaffected of the gear ratio of the feed cassette 44, which will be apparent below.

It is normal practice to a person skilled in the art to achieve a desired gear ratio by constructing or adapting the mutual sizes of the gears involved. Therefore, this is not described in detail in this application.

2. End Phase of Drilling (FIG. 3)

The intermediate feed gear 29 is held in the first gear position by interaction with an axially displaceable cylinder 32. The cylinder 32 is acted on towards the second gear position, i.e. to the right in the figure, by a retraction spring 33 which is interposed between the cylinder 32 and the opposed housing wall 34. The spring force is however overcome by a pneumatic pressure that acts in a chamber 35 on the opposite side of the cylinder 32. This pneumatic pressure is upheld during the whole of the positive feed drilling operation, i.e. for as long as the spindle is advanced. The chamber 35 is sealed by two sealings 49a and 49b, e.g. in the form of O-rings.

The closed chamber 35 is defined by the cylinder 32, a surrounding peripheral housing wall 43 and an annular housing element 61. The first sealing 49a is arranged to seal between the cylinder 32 and the peripheral housing wall 43, and the second sealing 49b is arranged to seal between the cylinder 32 and the annular housing element 61. The chamber 35 is expandable against the action of said spring 33 to push the cylinder 32 towards the first gear position away from the annular housing element 61 by the application of a pneumatic pressure inside said chamber 35.

The cylinder 32 is axially connected to the intermediate feed gear 29 via an axial bearing 50, which assures the axial alignment of the cylinder 32 and the intermediate feed gear 29 but allows the intermediate feed gear 29 to rotate with respect to the cylinder 32. The cylinder 32 is arranged such that it will not rotate with respect to the housing wall 43.

In FIG. 3 the spindle 11 is about to reach the end position of the drilling. A few moments before the spindle 11 reaches its stop position, where the stop ring 27 abuts a positive stop 36, an actuation part 37 of the stop ring 27 reaches a lever 38 of a retaining mechanism 39. The retaining mechanism further includes a one-toothed ratchet 40 which is rotated by the action of the lever 38 such that the tooth 57 of the ratchet 40 will point downwards into an interaction area, i.e. inside the peripheral housing wall 43, in which the tooth 57 will interact with the motion of the cylinder 32.

The ratchet 40 is spring loaded towards an open position, as shown in FIG. 2, in which the tooth 57 is positioned such that it does not reach into the interaction area such that it will not interfere with the cylinder 32. Further, the ratchet 40 is rotatable against the action of a spring 58 towards the lever 38. This allows the cylinder 32 to pass the tooth of the ratchet in the forward direction, i.e. to the right in the figure, such that the shoulder 55 may pass the tooth of the ratchet 40. The function of the retaining mechanism 39 will be more closely described below with reference to FIGS. 4 and 5.

Almost simultaneously as the stop ring 27 abuts the positive stop 36 the operational torque T in the feed gear 25 rises instantaneously. This increased torque will be transmitted via the intermediate feed gear 29, the first gear shaft 19, and the first and second coupling 20 and 18, respectively, to the second gear shaft 17. The coupling between the second gear shaft 17 and the second coupling 18 is achieved by means of a smoothly toothed interaction between the second coupling 18 and a clutch sleeve 42, which are held together by the action of a torque limiting spring 41. The spring 41 acts on the clutch sleeve 42, which is coupled via splines to the second gear shaft 17 and via said smoothly teethed interaction to the second coupling 18. The second coupling 18 is not in rotational engagement with the second gear shaft 17 but may rotate freely with respect to the same. Instead the rotation of the second coupling 18 is governed by its engagement to the clutch sleeve 42.

The spring force of the spring 41 is chosen such that the interaction between the clutch sleeve 42 and the second coupling 18 is broken when the operational torque T exceeds a predetermined advancement threshold value $T_A$. Once this predetermined threshold is exceeded, the connection will skip such that the driving of the feed gear 25 will be interrupted. Further, as soon as the connection will skip, the clutch sleeve 42 will be translated against the action of the spring 41 and away from the second coupling 18, i.e. to the left in the figure, and thereby open a passage (not shown) to release the pressure in the chamber 35. As the pressure in the chamber 35 is relieved the cylinder 32 and the intermediate feed gear 29 will be pushed under the action of the retraction spring 33 towards the second gear position, i.e. to the right in the figure, where the intermediate feed gear 29 engages with the intermediate drive gear 28. This will lead to the start of the retraction phase.

Start of Retraction of Spindle (FIGS. 4a-4b)

As the intermediate feed gear 29 is pushed to the second gear position it will remain coupled to the feed gear 25 via the same outer gear transmission 30. However, it will be disconnected from the inner gear transmission to the first gear shaft 19. This inner gear transmission is lost because instead of the toothed section 62 the inner blank section 54 of the intermediate feed gear 29 will be positioned opposite to the connective protrusion 63 of the first gear shaft 19, such that no interaction is achieved.

Instead, the intermediate feed gear 29 will be coupled to the intermediate drive gear 28. The interaction between the intermediate feed gear 29 and the intermediate drive gear 28 is assured by the action of the retraction spring 33 and is accomplished by means of a smoothly toothed interaction between the intermediate feed gear 29 and the intermediate drive gear 28. The spring action of the retraction spring 33 is moderate and smaller than the action of the torque limiting spring 41.

The intermediate feed gear 29 might get jammed at the final phase of the positive feeding during drilling and the operational torque T needed to loosen the intermediate feed gear 29 may very well be higher than what is possible to uphold by the action of the retraction spring 33 alone.

Therefore, the above mentioned retaining mechanism 39 is provided.

When the spindle 11 is in its most advanced position, i.e. as illustrated in FIGS. 4a and 4b, the one-toothed ratchet 39 is pushed by the action of the stop ring 27 on the lever 38, such that it is rotated around the axis X into its lowermost position. In this lowermost position the tooth 57 of the ratchet 40 will engage a shoulder 55 on the cylinder 32 as it passes under the ratchet due to the action of the retraction spring 33. The ratchet 40 is arranged to allow the cylinder 32 to pass towards engagement with the intermediate drive gear 28.

As is visible in FIG. 4b a support 59 is arranged to interact with a cam profile 60 of the ratchet 40 in order to stop the rotation of the ratchet 40 as it reaches the blocking position. Hence, in the position shown in FIG. 4b the lever 38 is restricted from moving counter clockwise due to its contact with the stop ring 27, and the ratchet 40 is restricted from moving clockwise due the contact between the cam profile 60 of the ratchet 40 and the support 59.

However, the spring 58 between the lever 38 and the ratchet 40 allows the ratchet 40 to be slightly rotated counter clockwise such that the shoulder 55 of the cylinder 32 may pass the tooth 57 of the ratchet 40 towards the second gear position, i.e. from the position shown in FIG. 3 into the position shown in FIGS. 4a and 4b.

In the position shown in FIGS. 4a and 4b, where engagement is accomplished between the intermediate feed gear 29 and the intermediate drive gear 28, the cylinder 32 will be blocked by the engagement between the tooth 57 of the ratchet 40 and the shoulder 55. This engagement will restrict the intermediate feed gear 29 from moving out of its engagement with the intermediate drive gear 28. Hence, even if the feed gear 25 is jammed to the spindle 11 such that the axial force produced in the smoothly toothed engagement between the intermediate feed gear 29 and the intermediate drive gear 28 exceeds the force exerted by the spring 33, the engagement between the intermediate feed gear 29 and the intermediate drive gear 28 will be held intact, such that the feed gear 25 and the spindle 11 will be loosened and such that the retraction of the spindle 11 will be commenced.

It is to be noted that even though the intermediate feed gear 29 will be coupled to the intermediate drive gear 28 such that they rotate at the same rotational speed, the feed gear 25 will rotate at a lower rotational speed than the drive gear 23. This is due to the fact that the gear ratio from the intermediate feed gear 29 to the feed gear 25 is different from the gear ratio from the intermediate drive gear 28 to the drive gear 23. It may be noted in FIG. 4a that the feed gear 25 has a slightly larger diameter than the drive gear 23. From this naturally follows that the rotational speed of the feed gear 25 will be lower than the rotational speed of the drive gear 23.

Further, of course, said difference in rotational speed between the feed gear 25 and the drive gear 23 will force the spindle 11 to be retracted, i.e. translated to the left in the figure.

Retraction Phase (FIG. 5)

FIG. 5 shows a part of the power tool during the retraction phase. FIG. 5 shows a more detailed view of the retaining mechanism 39 than the other figures.

During the first part of the retraction phase the front end 53 of the stop ring 27 will interact with the lever 38 of the retaining mechanism 39, such that the ratchet 40 will be raised and such that the tooth 57 on the ratchet 40 will no longer point downwards into the interaction area, where it engages the shoulder 55 of the cylinder 32 to block the intermediate feed gear 29 in the second gear position. The spring action of the retraction spring 33 will however be enough to withhold the interaction between the intermediate feed gear 29 and the intermediate drive gear 28 at this point, since the spindle has been loosened from the jammed position, whereby the retracting of the spindle 11 may be concluded at a relatively low torque.

End of Retraction (FIG. 6)

The retraction of the spindle 11 is concluded when the back part of the socket 12 on the spindle 11 abuts the drive gear 23. At this point and due to this interaction, the operational torque T will increase on the feed gear 25. The increase in torque will be sensed in the coupling between the intermediate feed gear 29 and the intermediate drive gear 28, such that the interaction in this coupling will be lost and the intermediate feed gear 29 and the cylinder 32 will be intermittently pushed against the action of the retraction spring 33, i.e. to the left in the figure. At this point the ratchet 40 is located such that its tooth 57 will not reach into the interaction area where it may otherwise interfere with the shoulder 55 on the cylinder 32.

As indicated above the spring action of the retraction spring 33 is moderate and smaller than the action of the torque limiting spring 41, which yields that the retraction threshold torque value $T_R$ is lower than the advancement threshold torque value $T_A$. Thereby, the engagement between the clutch sleeve 42 and the coupling 18 will override, i.e. be stronger than, the engagement between the intermediate drive gear 28 and the intermediate feed gear 29.

This is important because it is the engagement between the clutch sleeve 42 and the coupling 18 that will indirectly drive both the drive gear 23 and the feed gear 25 at the restart of the drilling operation, after concluded retraction. Hence, the spring action of the torque limiting spring 41 is set such that it will be enough to loosen the spindle 11 from its initial, i.e. retracted position. Just how hard the spindle 11 is jammed in its initial position is governed by the spring action of the retraction spring 33, as it is this spring action that is overcome and concludes the retraction when the operational torque T exceeds the retraction threshold torque value $T_R$ during the retraction phase.

The movement of the cylinder 32 as the spring action of the retraction spring 33 is overcome uncovers a valve located in the housing wall 43 around the first gear shaft 19. This is sensed by the control unit of the power tool, which thereby concludes the drill operation and closes the main valve 14 (shown only in FIG. 1).

The Inventive Method (FIG. 7)

As illustrated in FIG. 7, the invention also relates to method of performing an automated drilling operation. Preferably the methods is implemented in an advanced drilling equipment (ADE) comprising a tool holding spindle.

A first step of the method is to activate the advanced drilling equipment and start the drilling operation. Thereby, the spindle is set to rotate by means of a drive gear connected to the motor. Further the spindle is positively fed, i.e. advanced, by means of the feed gear, which is connected to the motor via a first gear transmission so as to perform drilling through a material.

The positive feeding, i.e. the advancement of the spindle, is continued until a desired point of drilling is achieved, e.g. when the spindle is fully advanced. The advancement of the spindle is interrupted at this desired point. In response to the interrupted feeding, the feed gear is connected to the motor via a second, negative gear transmission so as to retract the spindle.

In turn, the retraction of the spindle is interrupted by means of a retraction torque limiting coupling in response to that an operational torque T needed to retract the spindle exceeds a retraction torque threshold value $T_R$.

A lock mechanism 39 is however arranged to lock the retraction torque limiting coupling during an initial phase of the retraction such that the retraction torque limiting coupling will not be released during the initial phase of the retraction.

When the retraction has been initiated the lock mechanism is deactivated, such that the retraction torque limiting coupling is activated and such that the drilling operation will be interrupted in response to that the operational torque T needed to retract the spindle exceeds the retraction torque threshold value $T_R$.

In a specific embodiment of the inventive method the feeding of the spindle via the positive gear transmission is interrupted by means of second torque limiting coupling in response to that the operational torque T needed to feed the spindle exceeds an advancement torque threshold value $T_A$, which is higher than the retraction torque threshold value $T_R$.

A Specific Embodiment of the Lock Mechanism of the Inventive Power Tool (FIGS. 8-9)

The lock mechanism 39 is a central part of the invention. Above, the general function of the inventive power tool has been described, and in this general description the function of the lock mechanism has been described. Below, a specific embodiment of the lock mechanism 39 will be described with reference to FIGS. 8 and 9.

The lock mechanism 39 includes a ratchet 40 which is connected to a lever 38. The lever 38 and the ratchet 40 are arranged to rotate around an axis X. The ratchet 40 comprises a tooth 57, which may be positioned, by rotation of the ratchet 40, into an interaction area so as to interact with shoulder 55 on the cylinder 32 moving in said interaction area. (See e.g. FIG. 4*a*-4*b*). The lever 38 and the ratchet 40 are jointly spring loaded by means of a coil spring 56 towards the open position shown in FIG. 2, in which the tooth 57 is not positioned into the interaction area such that it does not interfere with the cylinder 32. Further, a spring 58 is arranged between the ratchet 40 and the lever 38 in order to separate the ratchet 40 from the lever 38. The ratchet 40 is rotatable against the action of the spring 58 towards the lever 38.

Above, the invention has been described with reference to specific embodiments. The invention is however not limited to either of these embodiments. Instead the scope of the invention is defined by the following claims.

The invention claimed is:

1. A power tool comprising:
a motor; and
a spindle which is drivingly connected to the motor via a drive gear that provides a rotational movement to the spindle and via a feed gear that is threaded onto the spindle such that mutual rotation between the feed gear and the spindle provides an axial movement to the spindle between a fully advanced position and a fully retracted position;
wherein a first gear transmission is arranged to drive the feed gear so as to advance the spindle, and a second gear transmission is arranged to drive the feed gear so as to retract the spindle;
wherein the spindle operates at an operational torque (T) and the second gear transmission includes a retraction torque limiting coupling adapted to be released when the operational torque (T) exceeds a retraction threshold torque ($T_R$);
wherein a lock mechanism is arranged to selectively lock the retraction torque limiting coupling such that it will not be released;
wherein the lock mechanism is arranged to lock the retraction torque limiting coupling when the spindle is in the fully advanced position; and
wherein the retraction torque limiting coupling comprises a smoothly toothed engagement which is held together by a spring, and the spring has a spring action ($F_A$) that corresponds to the retraction threshold torque ($T_R$), such that the smoothly toothed engagement is released when the operational torque (T) exceeds a value of the retraction threshold torque ($T_R$).

2. The power tool according to claim 1, wherein a cylinder for controlling gear transmission to the feed gear is arranged to be translated between a first gearing position which corresponds to the first gear transmission and a second gearing position which corresponds to the second gear transmission, and wherein the spring acts on the cylinder towards the second gearing position in which the smoothly toothed engagement is achieved.

3. The power tool according to claim 2, wherein the cylinder defines a closed chamber which is sealed off by sealings with respect to a surrounding housing and an annular housing element, and wherein the chamber is expandable against the action of said spring to push the cylinder towards the first gearing position away from the annular housing element by application of a pneumatic pressure inside said chamber.

4. The power tool according claim 3, wherein the second gear transmission includes a second torque limiting coupling adapted to be released when the operational torque (T) exceeds a value of an advancement threshold torque ($T_A$), which is higher than the value of the retraction threshold torque ($T_R$).

5. The power tool according to claim 4, wherein a valve is arranged to release the pressure acting in the chamber in response to the operational torque (T) exceeding the value of the advancement threshold torque ($T_A$) such that the second torque limiting coupling is released and such that the cylinder is translated towards the second gearing position by the action of the spring.

6. The power tool according to claim 2, wherein the lock mechanism comprises a ratchet which is rotatable around an axis between a blocking position in which a tooth on the ratchet is pointed towards an interaction area of the cylinder in order to interact with a shoulder on the cylinder, and a non-blocking position in which the tooth does not reach a moving area of the cylinder and wherein the interaction between the tooth and the shoulder on the cylinder blocks the cylinder from moving out of the second gearing position.

7. The power tool according to claim 6, wherein the lock mechanism further comprises a lever which is connected to the ratchet so as to rotate together with the ratchet, and wherein the spindle includes a stop ring which is arranged to act on the lever to position the ratchet in the blocking position as the spindle reaches a forward position.

8. The power tool according to claim 7, wherein the ratchet and lever are spring loaded towards an open position.

9. The power tool according to claim 7, wherein an interconnection between the lever and the ratchet includes a freedom of motion that allows the ratchet to rotate with respect to the lever, and wherein a spring is arranged between the lever and the ratchet to act on the ratchet towards the blocking position whereby the ratchet is movable with respect to the lever out of the blocking position against the action of the spring.

10. The power tool according to claim 9, wherein the ratchet is supported in the blocking position on a support, and wherein an interaction between the support and the ratchet restricts the ratchet from rotating further in a direction in which the cylinder moves past the interaction between the shoulder and the tooth and out of the second gearing position.

11. The power tool according to claim 10, wherein the ratchet has an outer cam profile that engages the support and that limits a rotational movement of the ratchet in the second gearing position.

* * * * *